United States Patent
Braun et al.

(10) Patent No.: US 7,133,160 B2
(45) Date of Patent: Nov. 7, 2006

(54) METHOD FOR SCREEN-ADAPTIVE COPY RETOUCHING

(75) Inventors: Klaus Braun, Kiel (DE); Winfried Werner, Kiel (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 1065 days.

(21) Appl. No.: 10/045,258

(22) Filed: Jan. 14, 2002

(65) Prior Publication Data

US 2002/0093700 A1    Jul. 18, 2002

(30) Foreign Application Priority Data

Jan. 12, 2001  (DE) ................. 101 01 137

(51) Int. Cl.
    *H04N 1/40* (2006.01)
(52) U.S. Cl. ........................ 358/3.2; 358/531
(58) Field of Classification Search ...... 358/1.17–1.18, 358/3.06–3.09, 3.2, 1.9, 2.1, 531
    See application file for complete search history.

(56) References Cited

U.S. PATENT DOCUMENTS 4,577,219 A    3/1986    Klie et al.
4,602,294 A    7/1986    Yamada
5,790,273 A    8/1998    Horfarter

FOREIGN PATENT DOCUMENTS

| DE | 31 40 955 C5 | 6/1982 |
| DE | 33 19 752 C2 | 12/1983 |
| DE | 198 42 573 A1 | 4/2000 |
| EP | 0 111 026 A1 | 6/1984 |
| EP | 0 111 026 B1 | 6/1984 |

*Primary Examiner*—Thomas D. Lee
*Assistant Examiner*—Stephen Brinich
(74) *Attorney, Agent, or Firm*—Laurence A. Greenberg; Werner H. Stemer; Ralph E. Locher

(57) ABSTRACT

A method for copy retouching digital image data which contains a periodic pattern, includes calculating a distance vector D1 from the initially defined starting positions of a read mark and a write mark. The image data are then copied from the image points located under the read mark to the image points located under the write mark. In order to avoid a possible offset of the copied pattern area with respect to the surrounding pattern, a corrected distance vector D2 is calculated in such a way that the read mark and the write mark have the same phase position in relation to the periodic pattern. The method is particularly suitable for copy retouching of screened color separation data.

4 Claims, 2 Drawing Sheets

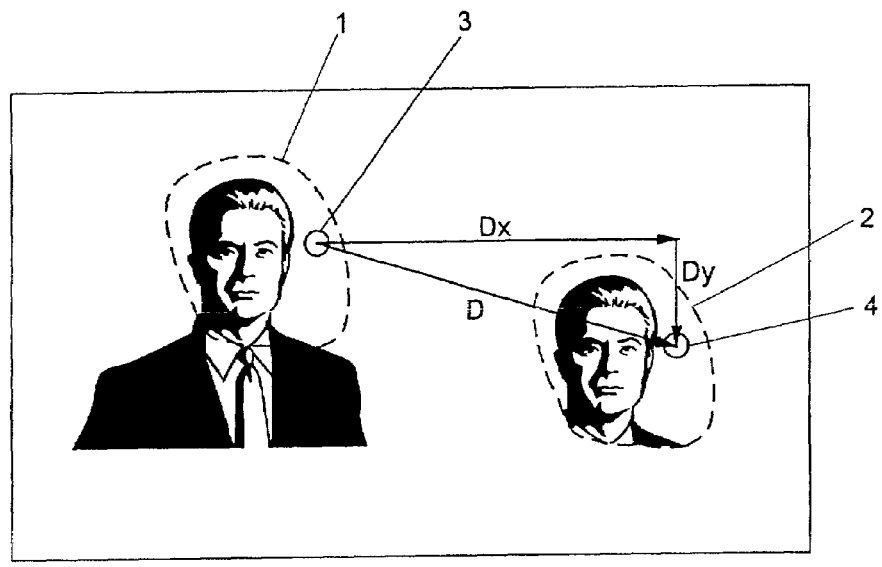
Fig. 1
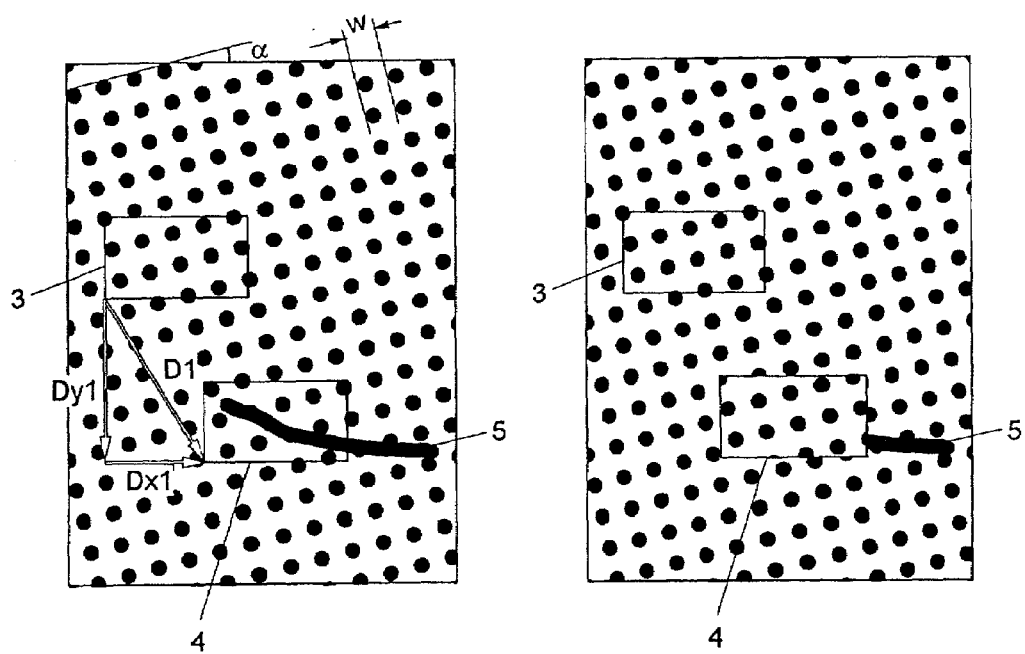 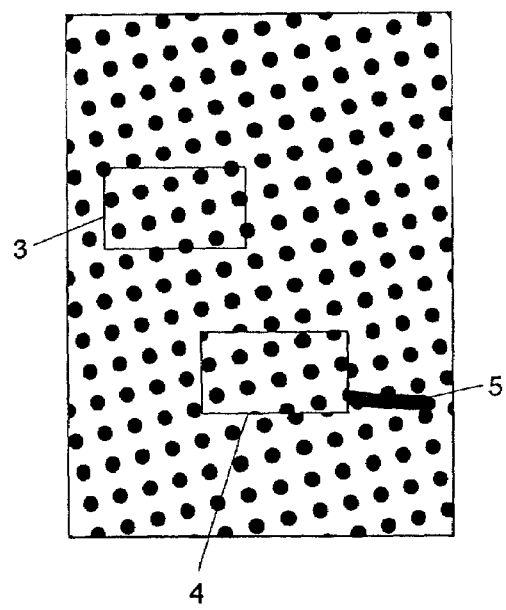
Fig. 2a    Fig. 2b

METHOD FOR SCREEN-ADAPTIVE COPY RETOUCHING

BACKGROUND OF THE INVENTION

FIELD OF THE INVENTION

The invention relates to the field of electronic reproduction technology and relates to a method for retouching the image data of a digitally stored image. Retouching methods are used in electronic reproduction technology in order to correct the color of the images and in order to eliminate faults in the image.

In reproduction technology, printing masters are produced for printed pages, and these printing masters contain all of the page elements to be printed, such as texts, graphics and images. In the case of electronically producing the printing masters, these elements are present in the form of digital data. For an image, the data are generated, for example, by scanning the original image point by point and row by row in a scanner. Each image point is broken down into color components and the color values of these components are digitized. Depending on the output process subsequently used, for example, output on a color printer or printing in a conventional printing machine, the data for the page elements are generated and stored in the color components red, green and blue (RGB) or in the printing colors of four-color printing, cyan, magenta, yellow and black (CMYK).

In the further working sequence, the digitized images, together with the texts and graphics, are assembled electronically on a computer workstation and are visually inspected on a color monitor, or automatically in accordance with stored layout specifications. At the same time, the finished printed page is converted into a data format suitable for output and is stored. The printed page data for each of the printing colors (RGB or CMYK) are referred to as color separation data. The color separation data are exposed on color separation films or on printing plates for conventional printing processes, or they are transferred directly to a color printer or to a digital printing machine and are printed out there. As a rule, the color separation data have to be screened before being output. That is to say, the intensity values of the color separation data are converted, for example, into a periodic pattern of screen dots of different size, with which, in the finished printed product, intensities of the printing colors that appear different to the eye are simulated. In addition, there are already screened color separation films that are to be integrated into a printed page to be newly produced. In this case, these color separation films are scanned at high resolution, and the digital data obtained in this way are used for the electronic montage of the printed page.

A retouching method which is often used is copying retouching, as described in European Patent EP 0 111 026 B1. It is used to transfer information from one image area to another image area pixel by pixel. It is therefore possible to eliminate faults in the image, such as scratches, by copying image points from an adjacent image area with a similar color and structure into the damaged image area. Copying retouching is also used, however, if for advertising graphic purposes, an object or a pattern in an image is to be repeated many times or copied into a different image.

FIG. 1 illustrates an example of the way that copying retouching functions. A read area 1 of an image is to be copied into a write area 2. For this purpose, the operator sweeps over the read area 1 with a read mark 3 that is masked in on the monitor screen and that has a shape and a size that can be selected as desired. The read mark represents an electronic retouching brush, which follows the movement of a coordinate registration pen or a computer mouse, which the operator moves appropriately. A write mark 4 is masked in on the monitor screen at a distance D whose distance and spacing is previously selected. The write mark 4 always follows the read mark 3 at the distance D. The distance D is a vector having the components Dx and Dy in a rectangular coordinate system. In a memory area of the computer workstation that contains the image, the image points located under the read mark 3 are continuously transferred into the corresponding image points under the write mark 4 during retouching.

If, by using copy retouching according to the prior art, a damaged image area which corresponds to the write area 2 is to be restored by copying image points from an adjacent read area, the operator manually selects the distance D by visually controlling the distance and direction using the monitor screen. For this purpose, for example, he marks the starting position of the read mark 3 and then the starting position of the write mark 4. From the two positions, the computer calculates the components Dx and Dy of the distance D, and during the subsequent retouching, the write mark 4 always tracks the read mark 3 at the distance D. If the image area to be retouched contains a periodic pattern, for example, the pattern of the screen dots in a scanned color separation film, it is difficult and time-consuming for the operator to mark the starting positions of the read mark 3 and the write mark 4 so accurately that the periodic pattern copied from the read area is present with exact coincidence on the pattern originally present in the write area. If the copied pattern does not fit exactly, the operator may have to erase the copied image data again and restart the copy retouching.

SUMMARY OF THE INVENTION

It is accordingly an object of the invention to provide a method for copy retouching digital image data that contains a periodic pattern, which overcomes the above-mentioned disadvantages of the prior art methods of this general type.

In particular, it is an object of the invention to provide a method for copy retouching with which a periodic pattern can be copied in exact register.

With the foregoing and other objects in view there is provided, in accordance with the invention, a method for copy retouching digital image data that contains a periodic pattern. The method includes steps of: defining a starting position of a read mark that has a phase position in relation to a periodic pattern; defining a staring position of a write mark; calculating a distance vector D1 between the starting position of the read mark and the starting position of the write mark; copying image data of image points located under the read mark into image points located under the write mark; and calculating a corrected distance vector D2 such that the phase position of the write mark is equivalent to the phase position of the read mark in relation to the periodic pattern.

In accordance with an added feature of the invention, the image data is rastered color separation data characterized by a raster width w and a raster angle $\alpha$.

In accordance with a concomitant feature of the invention, the method includes steps of: expressing the distance vector D1 with rectangular components Dx1 and Dy1; expressing the corrected distance vector D2 with rectangular components Dx2 and Dy2; determining the rectangular components Dx2 and Dy2 with equations: Dx2=(m)×(w)×(cos α)+(n)×(w)×(sin α), and Dy2=(m)×(w)×(sin α)+(n)×(w)× (cos α), where m and n are integers; and selecting the integers m and n to minimize equations: |Dx2−Dx1| and |Dy2−Dy1|.

Other features which are considered as characteristic for the invention are set forth in the appended claims.

Although the invention is illustrated and described herein as embodied in Method for screen-adaptive copy retouching, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 shows an image for demonstrating the operation of a prior art method of copy retouching;

FIG. 2a shows a detail of a screened color separation for illustrating a prior art method of copy retouching;

FIG. 2b shows a retouched extract obtained from the screened color separation shown in FIG. 2a when the prior art method of copy retouching is used;

DESCRIPTION OF THE PREFERRED EMBODIMENTS

Figure 3A:
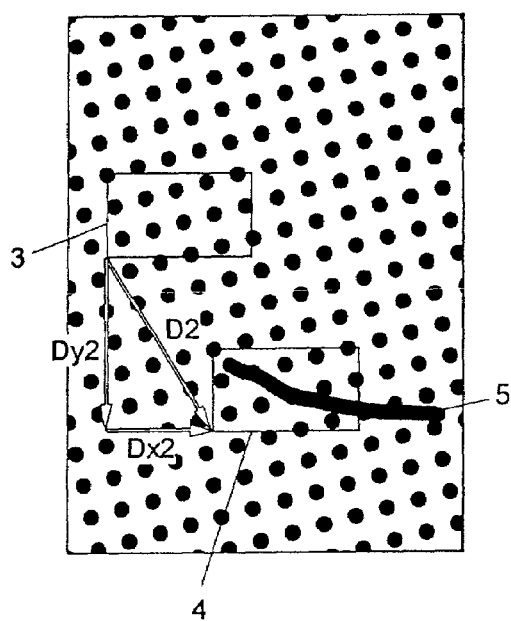
FIG. 3a shows a detail of a screened color separation for illustrating an inventive method of copy retouching.

Referring now to the figures of the drawing in detail and first, particularly, to FIG. 2A thereof, there is shown a detail from a screened color separation, whose screen is characterized by the screen width w and the screen angle α.

The extract contains a fault 5, which has been caused, for example, by a scratch on the scanned color separation film. The fault 5 is to be eliminated using known copy retouching. The operator marks the starting positions of the read mark 3, which is rectangular here, and of the write mark 4 of the same size. In this case, it is not possible to define the distance D1, in terms of distance and direction, with the required accuracy such that the read mark 3 and the write mark 4 have the same phase position with respect to the periodic screen, both in the x direction and in the y direction.

FIG. 2b shows the partly retouched extract, in which the image points within the read mark 3 have been copied into the corresponding image point positions of the write mark 4. Because of the unmatched phase position of the write mark 4, the pattern of the copied image points is offset with respect to the screen outside the write mark. The eye is very sensitive to such an irregularity in an otherwise uniform pattern, so that the offset of the copied image points manifests itself as particularly disruptive.

According to the inventive method, the distance D1, with its components Dx1 and Dy1, that is initially selected by the operator by marking the starting positions of read mark 3 and write mark 4 is subsequently automatically corrected so that the write mark 4 has the same phase position as the read mark 3 with respect to the screen, both in the x direction and in the y direction. For this purpose, corrected distance components Dx2 and Dy2 are calculated, which are given by the equations for the rotation of a regular grid of grid width w through the angle α in a rectangular coordinate system:

$$Dx2 = (m) \times (w) \times (\cos \alpha) + (n) \times (w) \times (\sin \alpha), \text{ and}$$

$$Dy2 = (m) \times (w) \times (\sin \alpha) + (n) \times (w) \times (\cos \alpha) \quad (1).$$

The integers m and n are in this case preferably selected such that the corrected distance components Dx2 and Dy2 differ from the originally selected distance components Dx1 and Dy1 only by the smallest possible differences; that is to say, the absolute differences:

$$|Dx2 - Dx1|, \text{ and}$$

$$|Dy2 - Dy1| \quad (2)$$

become a minimum. As a result, the corrected starting position of the write mark 4 in the vicinity of the end point of the distance vector D1 is selected to be the nearest point which, in the x direction and in the y direction, has the same phase position in relation to the screen as the starting position of the read mark 3.

Figure 3B:
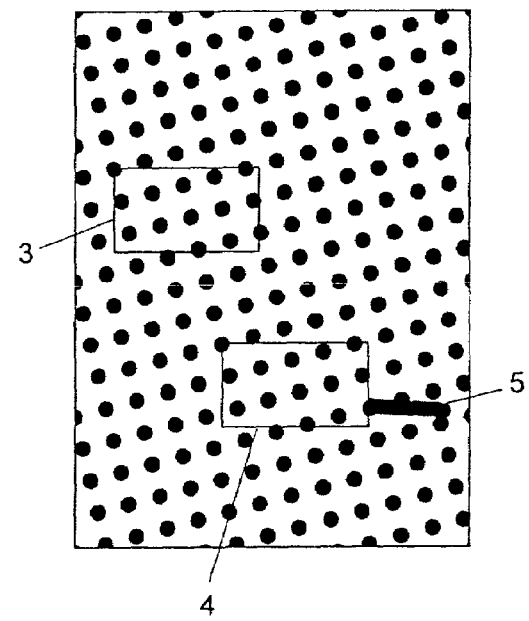
FIG. 3b shows the result obtained when using the inventive method of copy retouching.

FIG. 3a shows the position of read mark 3 and write mark 4 for the distance D2 corrected in accordance with the invention. FIG. 3b shows the partly retouched extract, in which an offset no longer occurs between the copied screen area and the surrounding screen. The parameters of the screen, screen width w and screen angle α, are generally known, so that the operator can enter them in advance or select them from a list stored in the computer. The screen parameters can also be registered while the color separation is scanned and can be written into an information block at the start of the color separation data, where the retouching method can then read them. Alternatively, however, they can also be determined from the image data of the scanned color separation, in accordance with one of the known methods, for example, by evaluating the two-dimensional autocorrelation function or by analyzing the Fourier transformation. The retouching method according to the invention is not restricted to the application in screened color separations. It can be used in those cases in which copy retouching is to be carried out in an image area that contains a periodic pattern.

We claim:

1. A method for copy retouching digital image data that contains a periodic pattern, which comprises:
   defining a starting position of a read mark that has a phase position in relation to a periodic pattern;
   defining a staring position of a write mark;
   calculating a distance vector D1 between the starting position of the read mark and the starting position of the write mark;
   copying image data of image points located under the read mark into image points located under the write mark; and
   calculating a corrected distance vector D2 such that a phase position of the write mark is equivalent to the phase position of the read mark in relation to the periodic pattern.

2. The method according to claim 1, wherein the image data is screened color separation data characterized by a screen width w and a screen angle α.

3. The method according to claim 2, which comprises:
   expressing the distance vector D1 with rectangular components Dx1 and Dy1;
   expressing the corrected distance vector D2 with rectangular components Dx2 and Dy2;
   determining the rectangular components Dx2 and Dy2 with equations:

$Dx2=(m)\times(w)\times(\cos\alpha)+(n)\times(w)\times(\sin\alpha)$, and $Dy2=(m)\times(w)\times(\sin\alpha)+(n)\times(w)\times(\cos\alpha)$, where m and n are integers; and selecting the integers m and n to minimize an absolute value of a difference (Dx2−Dx1) and an absolute value of a difference (Dy2−Dy1).

4. The method according to claim 1, which comprises:

expressing the distance vector D1 with rectangular components Dx1 and Dy1;

expressing the corrected distance vector D2 with rectangular components Dx2 and Dy2;

determining the rectangular components Dx2 and Dy2 with equations:

$Dx2=(m)\times(w)\times(\cos\alpha)+(n)\times(w)\times(\sin\alpha)$, and $Dy2=(m)\times(w)\times(\sin\alpha)+(n)\times(w)\times(\cos\alpha)$, where m and n are integers; and selecting the integers m and n to minimize an absolute value of a difference (Dx2−Dx1) and an absolute value of a difference Dy2−Dy1).

* * * * *